United States Patent
Wang et al.

(10) Patent No.: US 6,909,899 B2
(45) Date of Patent: Jun. 21, 2005

(54) METHOD AND APPARATUS FOR HANDOFF IN A COMMUNICATION SYSTEM SUPPORTING MULTIPLE SERVICE INSTANCES

(75) Inventors: Jun Wang, San Diego, CA (US); Raymond T. Hsu, San Diego, CA (US)

(73) Assignee: Qualcomm, Incoporated, San Diego, CA (US)

(*) Notice: Subject to any disclaimer, the term of this patent is extended or adjusted under 35 U.S.C. 154(b) by 104 days.

(21) Appl. No.: 10/095,498

(22) Filed: Mar. 11, 2002

(65) Prior Publication Data

US 2003/0171117 A1 Sep. 11, 2003

(51) Int. Cl.[7] .................................................. H04Q 7/24
(52) U.S. Cl. ................. 455/436; 455/432.1; 455/435.1; 455/439; 370/331
(58) Field of Search ................................. 455/436–439, 455/432.1, 442, 435.1, 451; 370/331, 338, 349, 466, 352

(56) References Cited

U.S. PATENT DOCUMENTS

| | | | | |
|---|---|---|---|---|
| 6,192,037 B1 | * | 2/2001 | Spear | 370/315 |
| 6,424,834 B1 | * | 7/2002 | Chang et al. | 455/436 |
| 6,504,567 B1 | * | 1/2003 | Pagan | 347/255 |
| 6,507,567 B1 | * | 1/2003 | Willars | 370/321 |
| 6,580,699 B1 | * | 6/2003 | Manning et al. | 370/331 |
| 6,781,999 B2 | * | 8/2004 | Eyuboglu et al. | 370/399 |
| 2001/0030953 A1 | * | 10/2001 | Chang | 370/331 |
| 2001/0048693 A1 | * | 12/2001 | Lee et al. | 370/469 |
| 2002/0021681 A1 | * | 2/2002 | Madour | 370/331 |
| 2002/0097707 A1 | * | 7/2002 | Balazinski et al. | 370/351 |

FOREIGN PATENT DOCUMENTS

| | | | | |
|---|---|---|---|---|
| CA | 2359040 A1 | * | 3/2002 | H04B/7/26 |
| WO | WO 0167786 A2 | | 9/2001 | |

* cited by examiner

Primary Examiner—William Trost
Assistant Examiner—Brandon J. Miller
(74) Attorney, Agent, or Firm—Philip R. Wadsworth; Thien T. Nguyen; Sandra L. Godsey

(57) ABSTRACT

Method and apparatus for effecting handoff in a system supporting both wireless and packet data service communications. In one embodiment, the serving network provides information to the target network sufficient to establish the Point-to-Point Protocol (PPP) connections for handoff. In an alternate embodiment, the serving network and the target network do not share capabilities with respect to concurrent multiple service instances. When the serving network knows the status of the target network, the serving network takes responsibility for the handoff.

21 Claims, 13 Drawing Sheets

METHOD AND APPARATUS FOR HANDOFF IN A COMMUNICATION SYSTEM SUPPORTING MULTIPLE SERVICE INSTANCES

BACKGROUND

1. Field

The present invention relates to wireless communication systems generally and specifically, to methods and apparatus for handoff for a packet data service

2. Background

There is an increasing demand for packetized data services over wireless communication systems. As traditional wireless communication systems are designed for voice communications, the extension to support data services introduces many challenges. Specifically, the problems exist during handoff involving a Point-to-Point Protocol (PPP) communication of data packets. As systems upgrade components, compatibility issues between components may hinder operation of the system. Further, there is a desire to remove handoff responsibility from the mobile station and provide smart handoff by the infrastructure elements.

There is a need, therefore, for fast, accurate handoff between Packet Data Service Nodes (PDSNs) and other infrastructure elements in a wireless communication system.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops the exemplary embodiments by first presenting a network implementing mobile IP to communicate data to and from a mobile node. Then a spread-spectrum wireless communication system is discussed. Next, the mobile IP network is shown implemented in the wireless communication system. The messages are illustrated that register a mobile node with a home agent thereby enabling IP data to be sent to and from the mobile node. Finally, methods for reclaiming resources at the home agent are explained.

Note that the exemplary embodiment is provided as an exemplar throughout this discussion; however, alternate embodiments may incorporate various aspects without departing from the scope of the present invention. Specifically, the various embodiments are applicable to a data processing system, a wireless communication system, a mobile IP network and any other system desiring efficient use and management of resources.

The exemplary embodiment employs a spread-spectrum wireless communication system. Wireless communication systems are widely deployed to provide various types of communication such as voice, data, and so on. These systems may be based on Code Division-Multiple Access (CDMA), Time Division Multiple Access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the CDMA2000 standard of protocols. Alternate embodiments may incorporate another standard.

Figure 10:
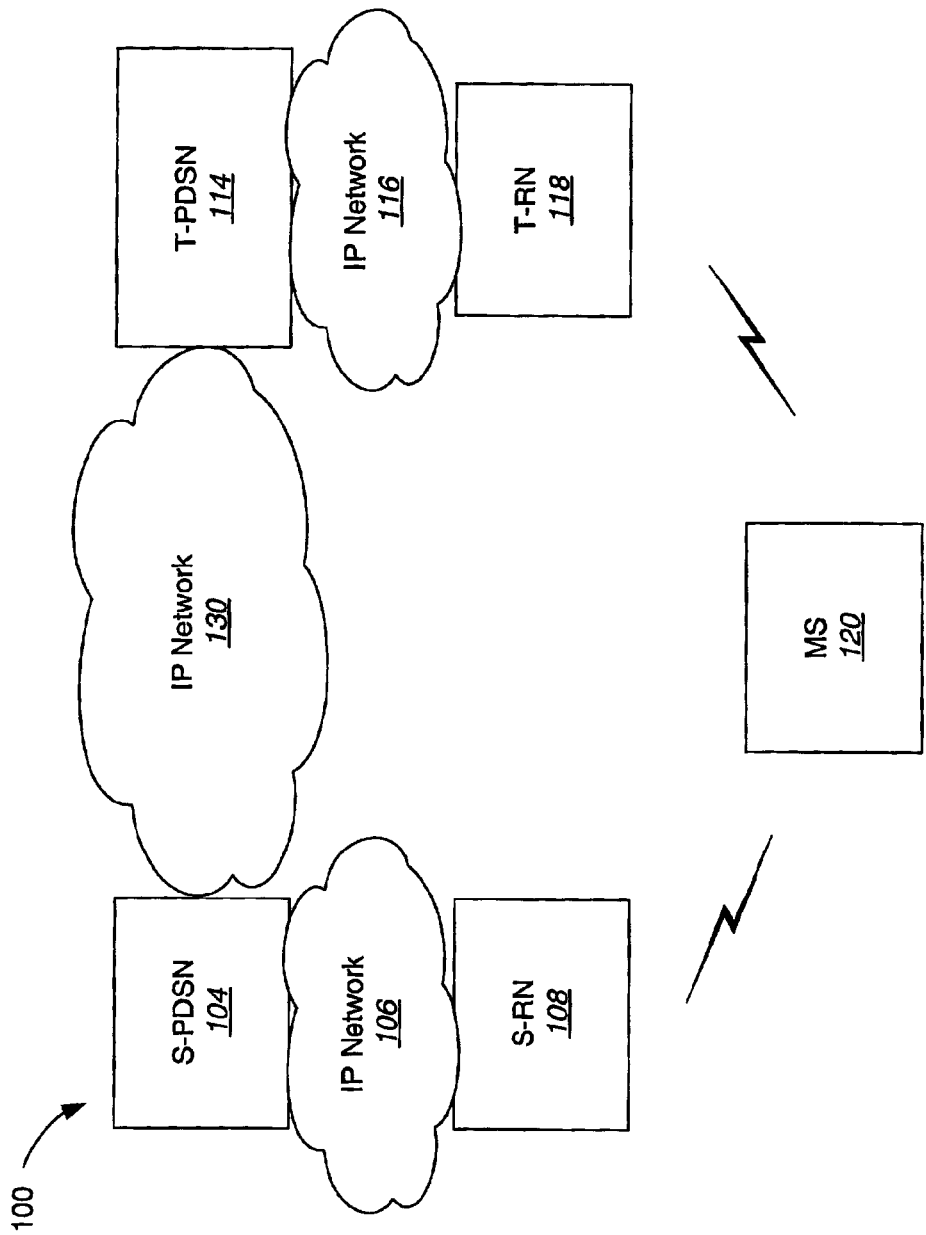
FIG. 10 is a block diagram of the communication system supporting IP data transmissions.

A communication system 100 according to one embodiment is shown in FIG. 10. The communication system 100 includes both wireless portions and Internet Protocol (IP) portions. The terminology used to describe the various elements of the system 100 is intended to facilitate understanding of the handoff processes described herein. A Mobile Station 120 operating within communication system 100 is first in communication with a Source-Radio Network (S-RN) 108, wherein the term source refers to the RN as being the original serving network. The MS 120 has established a Service Instance (SI) with S-RN. A service instance refers to a link associated with a service option. For example, a service option may be a packet data link, a Voice over IP (VoIP) link, etc. The S-RN has established an A-10 connection with the Source-PDSN (S-PDSN) 104 via an IP Network 106. The A-10 connection is associated with the SI. Note that the various elements of the system, such as the S-PDSN 104, S-RN 108, and the MS 120, may support only one SI, or may support multiple SI. Also, within a given system, such as system 100, various elements may support only a single SI while other elements support multiple SI. The later system configurations may lead to incompatibilities in the capabilities of the various elements, and thus effect handoff. The S-PDSN 104 is also in communication with an IP Network 130. Operation of system 100 may be as specified in the cdma2000 Wireless IP Network Standard.

The MS 120 is mobile and may move into an area supported by a Target-RN (T-RN) 118. As the MS 120 is able to communicate with T-RN 118, handoff may proceed from S-RN 108 to T-RN 118. Once handoff of the wireless portion of the communication system 100 is completed, the packet data portion of the system 100 must set up the various PPP links, such as an A-10 connection from T-PDSN 114 to T-RN 118 through IP Network 116. As discussed hereinabove, various scenarios are possible for the configuration and handoff processing of a system, such as system 100.

Figure 1:
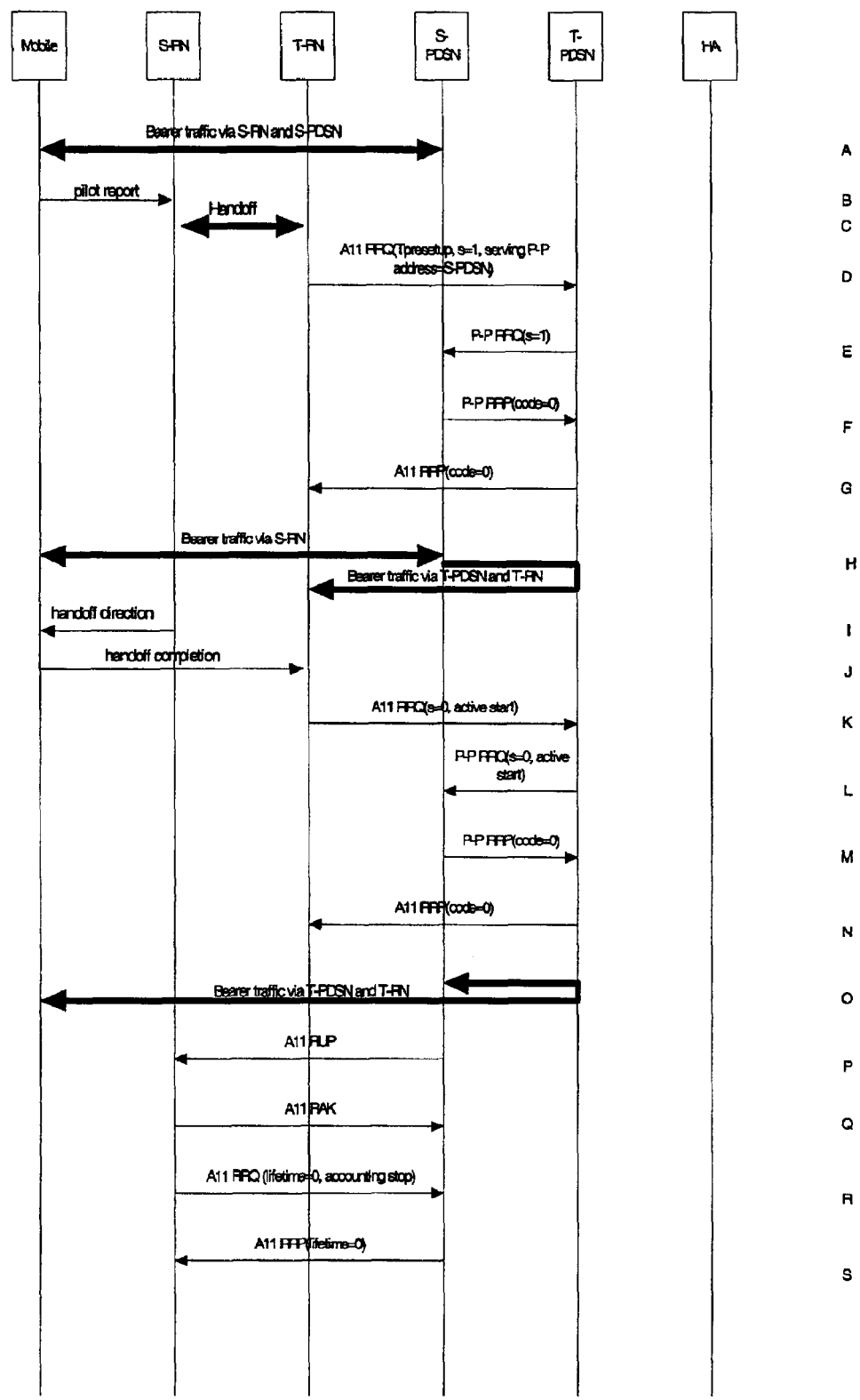
FIG. 1 is a timing diagram illustrating a call flow in a communication system, wherein the Source-PDSN (S-PDSN) and the Target-PDSN (T-PDSN) have similar capability.
Figure 11:
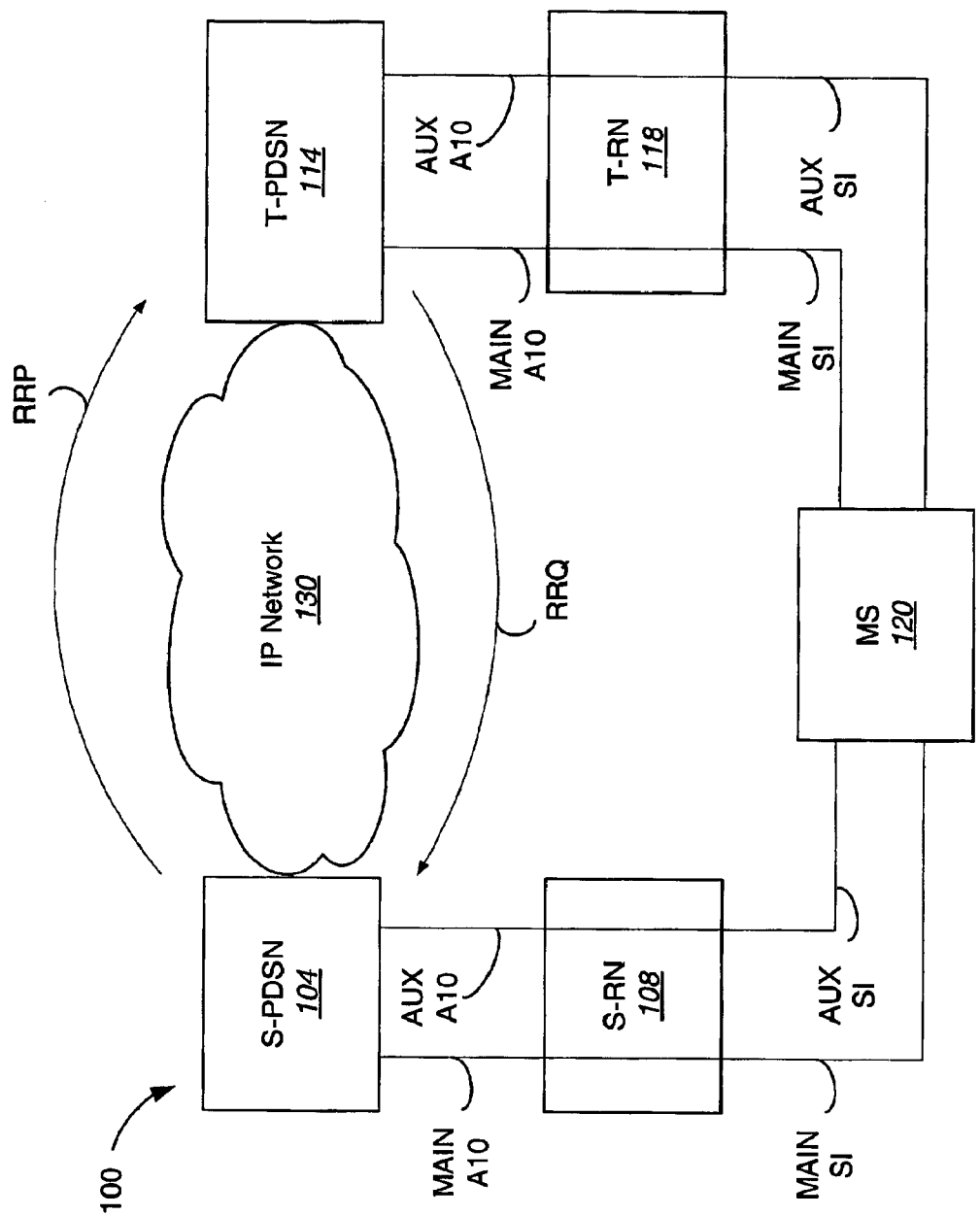
FIG. 11 illustrates communication links involved in a handoff example for a system wherein the S-PDSN and the T-PDSN have similar capability.

In a first scenario, illustrated in FIG. 1 and with reference to FIG. 11, the S-PDSN 104 and the T-PDSN 114 have a same capability with respect to handling Service Instances (SI). As illustrated in FIG. 11, multiple SI links may be established to both S-PDSN 104 and T-PDSN 114. For multiple SI links, one link is designated as a main link, or PPP link. The main link is used for setting up the PPP link and is also used for signaling associated with the multiple links. The main link is the link on which the primary packet service instance is connected. It is the service instance that is first negotiated when establishing the packet service. This means that the initial PPP negotiation takes place over this service instance. The primary packet service instance has a direct relation to the packet data session itself. This means that whenever there is a packet data session, there's a primary packet service instance connected to it. The main link is identified as "MAIN SI." Additional links are referred to as auxiliary or secondary links, identified as "AUX SI." Each link is further defined by an A-10 connection to a PDSN.

In the call flow scenario of FIG. 1, the infrastructure elements, S-PDSN 104 and T-PDSN 114 successfully handoff the communication with MS 120. The handoff is effected without passing responsibility on to MS 120. In other words, MS 120 is not required to initiate a new communication at the target network, such as may have been required if handoff were not successful and the target network would tear down the main SI and auxiliary SI. As in FIG. 1, S-PDSN 104 provides T-PDSN 114 with the necessary information to establish communication with MS 120. Note that even though handoff is completed within the radio network or wireless portion of the system, the packet data portion or IP portion requires additional information to set up the various connections required. For example, the T-PDSN 114 needs to know which SI is the main SI, as the T-PDSN 114 needs to negotiate PPP set up on the main SI.

FIG. 1 illustrates a call flow associated with fast handoff of one embodiment. FIG. 1 illustrates a successful case when the handoff happens between the same revisions of two PDSNs, e.g. both PDSN are implementing IS-835-B procedures. In this case, there are PDSN to PDSN (P—P) connections established successfully between the Target-PDSN (T-PDSN) and the Serving-PDSN (S-PDSN). In the situation that P—P connections can not be established correctly, the normal hard handoff should occur without tearing the traffic channel. However, if multiple service instances exist (for example, voice over IP), the target PDSN does not know the PPP service instance (main service instance), therefore, it can not initiate PPP negotiation on the correct R-P connection. Each labeled step of call flow of FIG. 1 is detailed as follows:

A. The mobile station has one or more sessions established to the Source-Packet Data Service Node (S-PDSN) via the Source-Radio Network (S-RN). The mobile station may have multiple service instances allocated in the S-RN.

B. The mobile station detects the pilot signal strength changes and sends pilot reports to the S-RN. At this time, the mobile still has airlink traffic channels to the S-RN and an Internet Protocol (IP) session established to the S-PDSN.

C. S-RN sends handoff request message to Target-Radio Network (T-RN) via Mobile Switching Center (MSC) (not shown).

D. The T-RN sends an A11 Registration Request (RRQ) to the Target-Packet Data Service Node (T-PDSN) including the s bit set to 1 and the serving P—P address attribute set to the Pi IP address of the S-PDSN. P—P refers to the connection between the S-PDSN and the T-PDSN. Pi refers to the PDSN to IP connection. The s bit indicates simultaneous binding.

E. The T-PDSN sends a P—P RRQ including the s bit set to 1 to the S-PDSN's Pi IP address. The setting of the s bit indicates a request for a simultaneous binding at the S-PDSN.

F. The S-PDSN replies with a P—P Registration Reply (RRP) with the reply code set to 0. The reply code indicates whether the operation is successful (or failure). The reply code 0 corresponds to a successful operation, wherein the reply code other than 0 gives a different failure reason.

G. The T-PDSN sends an A11 RRP with the reply code set to 0 to the T-RN.

H. At this point, forward direction bearer traffic arriving at the S-PDSN is bicast to the S-RN and the T-PDSN. The T-RN may buffer the last N packets, where N is implementation dependent. Reverse direction bearer traffic traverses only the S-RN and the S-PDSN.

I. The S-RN hands off the mobile's Service Instance(s) (Sis) to the T-RN by sending a handoff direction command to the mobile station.

J. The mobile station handoffs to the T-RN and sends a handoff completion indication to the T-RN.

K. Upon completion of the handoff of the Service Instances (SIs), the T-RN sends an A11 RRQ with the s bit set to 0 and including an active start airlink record to the T-PDSN.

L. The T-PDSN sends a P—P RRQ with the s bit set to 0 and including an active start airlink record to the S-PDSN. The active start airlink record sent is the same one that was received from the T-RN.

M. The S-PDSN replies with a P—P RRP with the reply code set to 0.

N. The T-PDSN sends an A11 RRP with the reply code set to 0 to the T-RN.

O. At this point, forward direction bearer traffic is tunneled from the S-PDSN to the T-PDSN over the P—P interface, then switched onto the appropriate A10 session and delivered to the T-RN. Reverse direction bearer traffic is sent from the mobile to the T-RN, then over the appropriate A10 session to the T-PDSN. The T-PDSN tunnels this traffic over the P—P interface to the S-PDSN. Note that the P—P session may be periodically refreshed by the T-PDSN sending a P—P RRQ to the S-PDSN.

P. The S-PDSN initiates a teardown of the mobile's A10/A11 session(s) to the S-RN by sending an A11 RUP to the S-RN.
Q. The S-RN responds with an A11 RAK.
R. The S-RN indicates that the session will be terminated by sending an A11 RRQ to the S-PDSN with the lifetime set to 0, including an active stop accounting record. Note that the accounting record will send to Authentication Authorization and Accounting (AAA) unit from Serving PDSN. AAA is not shown.
S. The S-PDSN indicates that the session is released by sending an A11 RRP to the S-RN with the lifetime set to 0. Note that the S-PDSN does not delete the associated PPP context because it is being used by the mobile via the P—P interface.

In a second scenario, illustrated in FIG. 2, again S-PDSN and T-PDSN share same capabilities, however, they fail to negotiate the handoff of the multiple SI links. The S-PDSN is able to send a message indicating which of the links is the main link. The T-PDSN then takes responsibility for the handoff and sets up connections for the MS.

Figure 2:
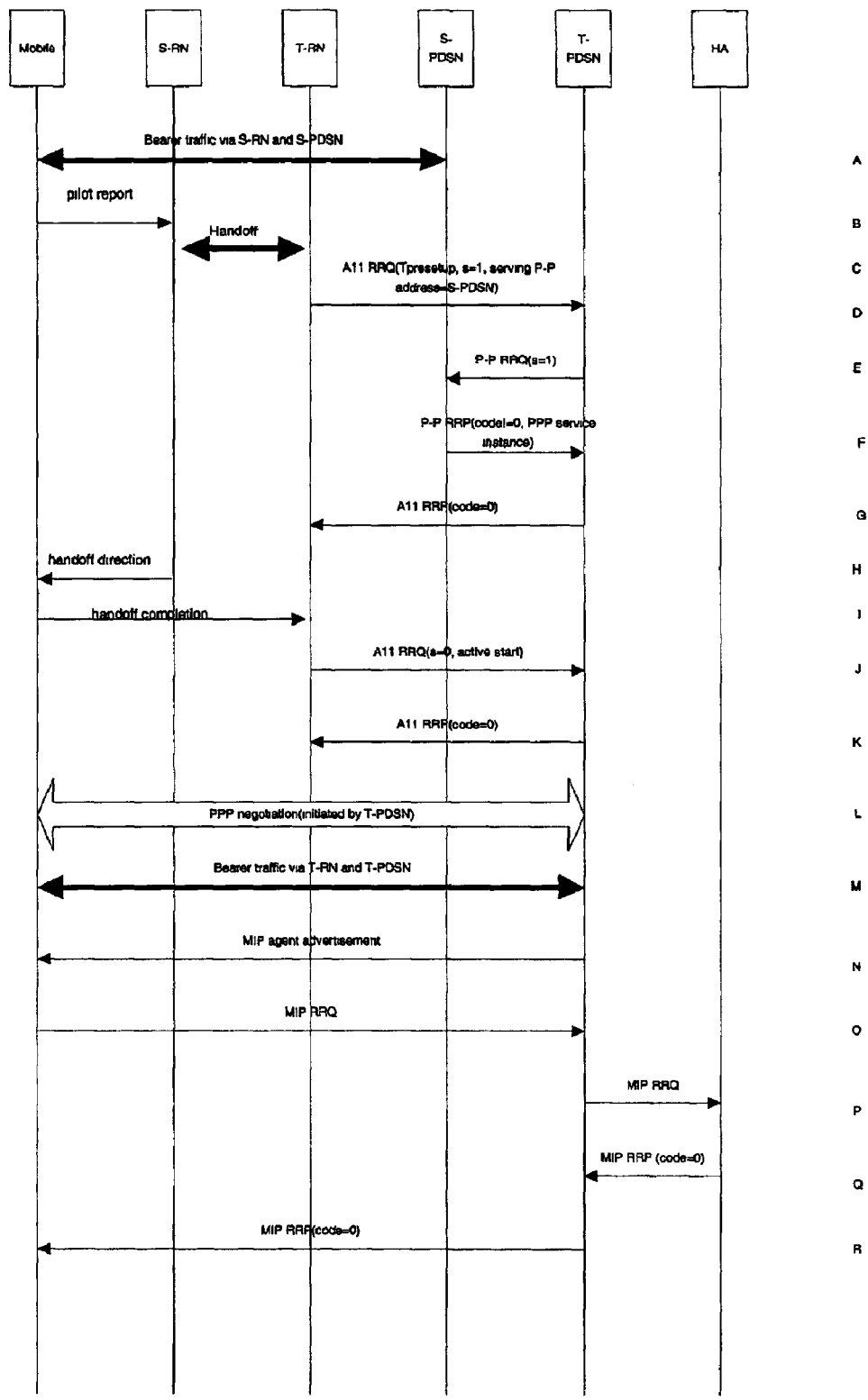
FIGS. 2 to 4 are timing diagrams illustrating a call flows in communication systems, wherein the S-PDSN and the T-PDSN have similar capability, but are not able to fully negotiate handoff.

Note that the serving PDSN desires to send PPP service instance indication to the target PDSN in P—P RRP during the period of the signaling exchange to setup P—P connections. This information may be sent regardless of whether P—P connections are setup successfully or unsuccessfully. In the case that the P—P connections establishment fails or later some disconnection between T-PDSN and S-PDSN is detected, the target PDSN uses this information to trigger the PPP negotiation on the correct R-P connection. FIG. 2 illustrates this type of call flow. Each labeled step of call flow of FIG. 1 is detailed as follows:

A. The mobile station has one or more sessions established to the S-PDSN via the S-RN. The mobile may have multiple service instances allocated in the S-RN.
B. The mobile station detects the pilot signal strength changes and sends pilot reports to the S-RN. Note that the mobile still has airlink traffic channels to the S-RN and an IP session established to the S-PDSN.
C. S-RN sends handoff request message to T-RN via MSC (not shown).
D. The T-RN sends an A11 RRQ to the T-PDSN including the s bit set to 1 and the serving P—P address attribute set to the Pi IP address of the S-PDSN.
E. The T-PDSN sends a P—P RRQ including the s bit set to 1 to the S-PDSN's Pi IP address. The setting of the s bit indicates a request for a simultaneous binding at the S-PDSN.
F. The S-PDSN replies with a P—P RRP with a reply code other than 0, indicating that the P—P session cannot be established and indicating the PPP service instance.
G. The T-PDSN send an A11 RRP with the reply code set to 0 to the T-RN.
H. The S-RN hands off the mobile's service instance(s) to the T-RN by sending handoff direction command to the mobile station.
I. The mobile station handoffs to the T-RN and sends handoff completion indication to the T-RN.
J. Upon completion of the handoff of the service instances, the T-RN sends an A11 RRQ with the s bit set to 0 and including an active start airlink record to the T-PDSN.
K. The T-PDSN sends an A11 RRP with the reply code set to 0 to the T-RN.
L. The T-PDSN initiates PPP negotiation with the mobile by sending it a LCP-configure-request.
M. PPP negotiation is complete. For simple IP sessions, bearer traffic may now flow in both directions over the T-RN and T-PDSN. For MIP sessions, the behavior is as follows below.
N. The T-PDSN sends a Mobile IP (MIP) agent advertisement to the mobile. Note that the mobile may first send a MIP agent solicitation to the T-PDSN (not shown).
O. The mobile sends a MIP RRQ to the T-PDSN.
P. The T-PDSN processes the MIP RRQ and then forwards it on to the HA.
Q. If the MIP RRQ is accepted, the HA responds with a MIP RRP with a reply code of 0.
R. The T-PDSN forwards the MIP RRP to the mobile. The mobile may now send and receive bearer data via its MIP session.

Figure 3:
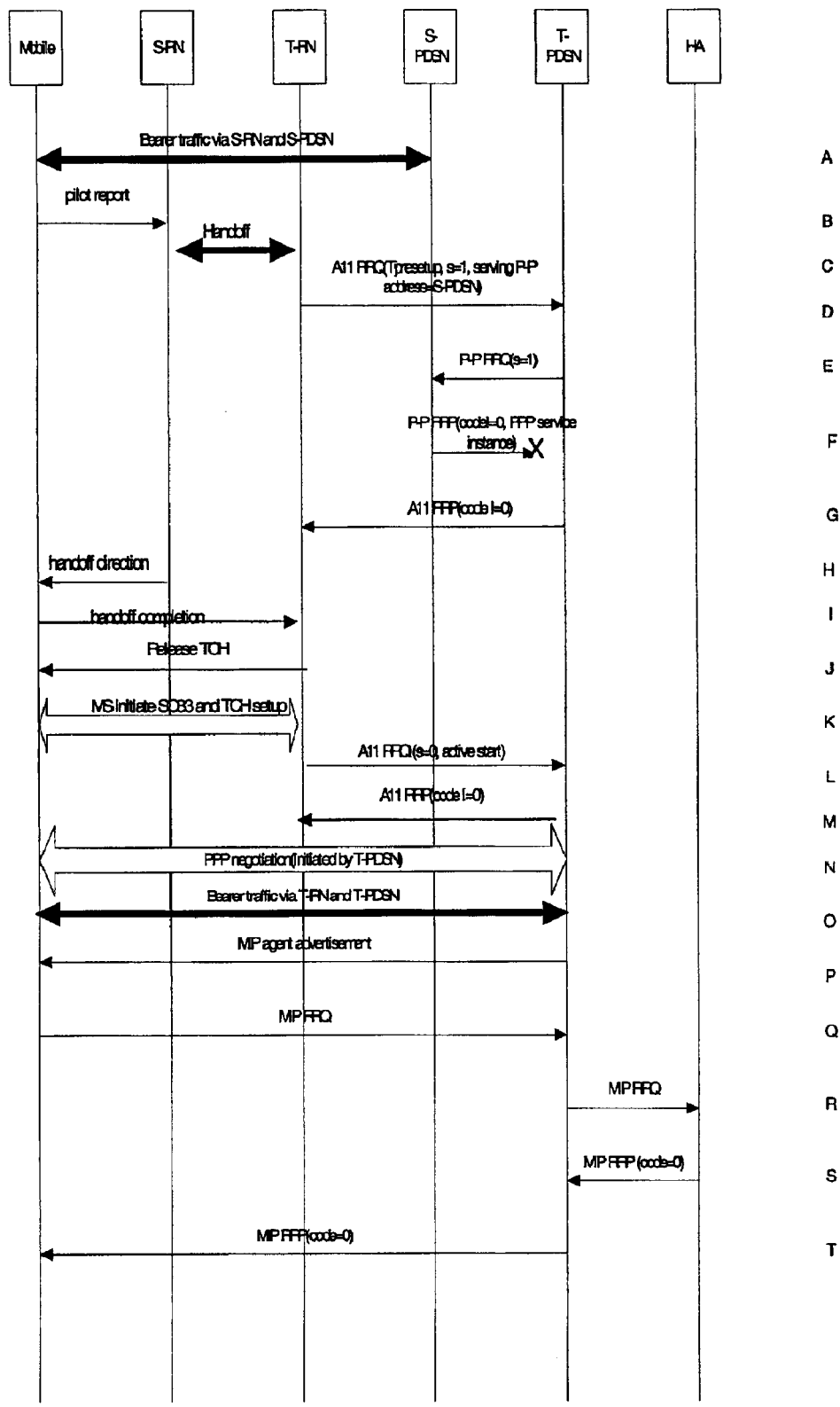

If the target PDSN can not receive the P—P RRP correctly after several retransmissions, the target PDSN should indicate to the target RN in A11 RRP that the operation is failed. In response, the T-RN will release the traffic channel. In this third scenario, the target PDSN cannot receive any messages from the serving PDSN, and therefore, the MS releases the traffic channel. The responsibility for handoff falls to the MS, as the MS initiates the communications, i.e., sessions, with the target network. Note that for a given system, the radio network level handoff may have been completed successfully, however, the packet data network level must also accomplish a handoff from the S-PDSN to the T-PDSN. The third scenario is illustrated in FIG. 3, wherein each labeled step is described as follows:

A. The mobile station has one or more sessions established to the S-PDSN via the S-RN. The mobile may have multiple service instances allocated in the S-RN.
B. The mobile station detects the pilot signal strength changes and sends pilot reports to the S-RN. Please note that the mobile still has airlink traffic channels to the S-RN and an IP session established to the S-PDSN.
C. S-RN sends handoff request message to T-RN via MSC (not shown).
D. The T-RN sends an A11 RRQ to the T-PDSN including the s bit set to 1 and the serving P—P address attribute set to the Pi IP address of the S-PDSN.
E. The T-PDSN sends a P—P RRQ including the s bit set to 1 to the S-PDSN's Pi IP address. The setting of the s bit indicates a request for a simultaneous binding at the S-PDSN.
F. The T-PDSN does not receive a P—P RRP after a configurable number of retransmissions of the P—P RRQ.
G. The T-PDSN sends an A11 RRP with the reply code set to other than 0 to the T-RN.
H. The S-RN hands off the mobile's service instance(s) to the T-RN by sending handoff direction command to the mobile station.
I. The mobile station handoffs to the T-RN and sends handoff completion indication to the T-RN.
J. Upon completion of the handoff of the service instances, the T-RN releases the traffic channel.
K. The MS re-initiates the SO33 to setup the traffic channel. The $SO_{33}$ refers to the data service option 33 as specified in IS707.
L. T-RN sends A11 RRQ to set up R-P connection.
M. T-PDSN replies with A11 RRP with result code set to '0'.
N. The MS initiates PPP negotiation with the T-PDSN by sending it an LCP-configure-request.
O. PPP negotiation is complete. For simple IP sessions, bearer traffic may now flow in both directions over the T-RN and T-PDSN. For MIP sessions, the behavior is as follows below.
P. The T-PDSN sends a MIP agent advertisement to the mobile. Note that the mobile may first send a MIP agent solicitation to the T-PDSN (not shown).

Q. The mobile sends a MIP RRQ to the T-PDSN.
R. The T-PDSN processes the MIP RRQ and then forwards it on to the HA.
S. If the MIP RRQ is accepted, the HA responds with a MIP RRP with a reply code of 0.
T. The T-PDSN forwards the MIP RRP to the mobile. The mobile may now send and receive bearer data via its MIP session.

In a fourth scenario, the target network, and T-PDSN specifically, is unable to receive handoff information from the source network, and S-PDSN specifically. The target network attempts to set up the PPP connections via all of the SI links. In other words, since the T-PDSN does not know which SI link to use for setting up the PPP connection, it sends the request information on all links. In this case, the T-PDSN sends a Link Control Protocol (LCP) registration message on all SI links. In the present example, the MS desires two links, one for packet data, such as web accesses, and one for Voice over IP (VoIP). The target PDSN can still indicate the target RN in A11 RRP that the operation is successful. And then the T-PDSN sends LCP Configure Request on all R-P connections to trigger the PPP negotiation. The PPP negotiation will occur over the PPP service instance.

Figure 4:
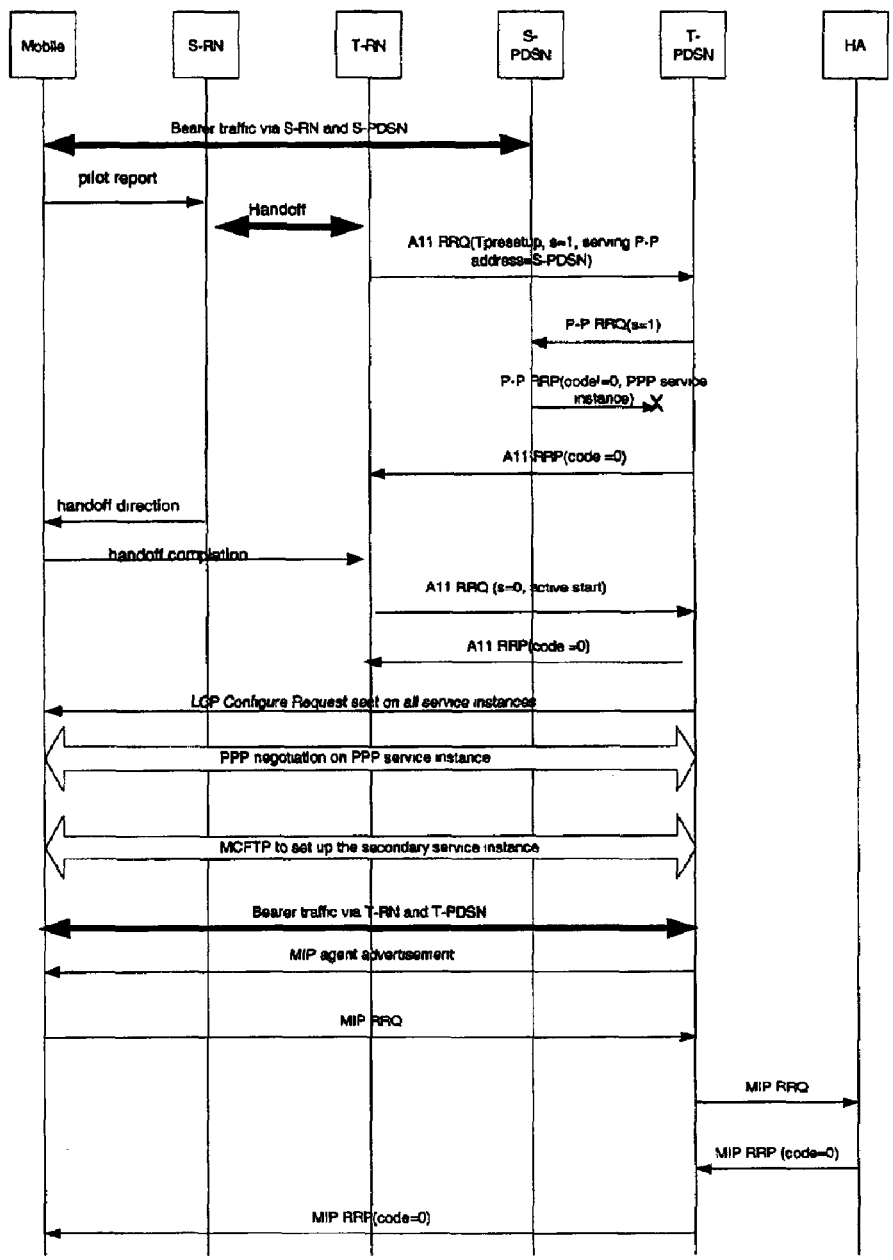

For the secondary packet service instance(s), LCP Configure Request is treated as packet data payload (for example, for Voice over IP, it is treated as RTP payload), therefore, it will be either discarded if the format is not correct or be passed to the application and is treated as error. After PPP session is setup, MCFTP can be used for setup the secondary packet service instance(s). Each labeled step in the call flow of FIG. 4 is described as follows:

A. The mobile station has one or more sessions established to the S-PDSN via the S-RN. The mobile may have multiple service instances allocated in the S-RN.
B. The mobile station detects the pilot signal strength changes and sends pilot reports to the S-RN. Please note that the mobile still has airlink traffic channels to the S-RN and an IP session established to the S-PDSN.
C. S-RN sends handoff request message to T-RN via MSC (not shown here).
D. The T-RN sends an A11 RRQ to the T-PDSN including the s bit set to 1 and the serving P—P address attribute set to the Pi IP address of the S-PDSN.
E. The T-PDSN sends a P—P RRQ including the s bit set to 1 to the S-PDSN's Pi IP address. The setting of the s bit indicates a request for a simultaneous binding at the S-PDSN.
F. The T-PDSN does not receive a P—P RRP after a configurable number of retransmissions of the P—P RRQ.
G. The T-PDSN sends an A11 RRP with the reply code set to 0 to the T-RN.
H. The S-RN hands off the mobile's service instance(s) to the T-RN by sending handoff direction command to the mobile station.
I. The mobile station handoffs to the T-RN and sends handoff completion indication to the T-RN.
J. Upon completion of the handoff of the service instances, the T-RN sends A11 RRQ to T-PDSN.
K. T-PDSN replies with A11 RRP.
L. T-PDSN sends LCP Configure Request on all service instances.
M. The PPP negotiation only occurs over PPP service instance.
N. MCFTP sent over PPP service instance is used for setup flow treatment and channel treatment for secondary service instance(s).
O. For simple IP sessions, bearer traffic may now flow in both directions over the T-RN and T-PDSN. For MIP sessions, the behavior is as follows below.
P. The T-PDSN sends a MIP agent advertisement to the mobile. Note that the mobile may first send a MIP agent solicitation to the T-PDSN (not shown).
Q. The mobile sends a MIP RRQ to the T-PDSN.
R. The T-PDSN processes the MIP RRQ and then forwards it on to the HA.
S. If the MIP RRQ is accepted, the HA responds with a MIP RRP with a reply code of 0.
T. The T-PDSN forwards the MIP RRP to the mobile. The mobile may now send and receive bearer data via its MIP session.

Figure 5:
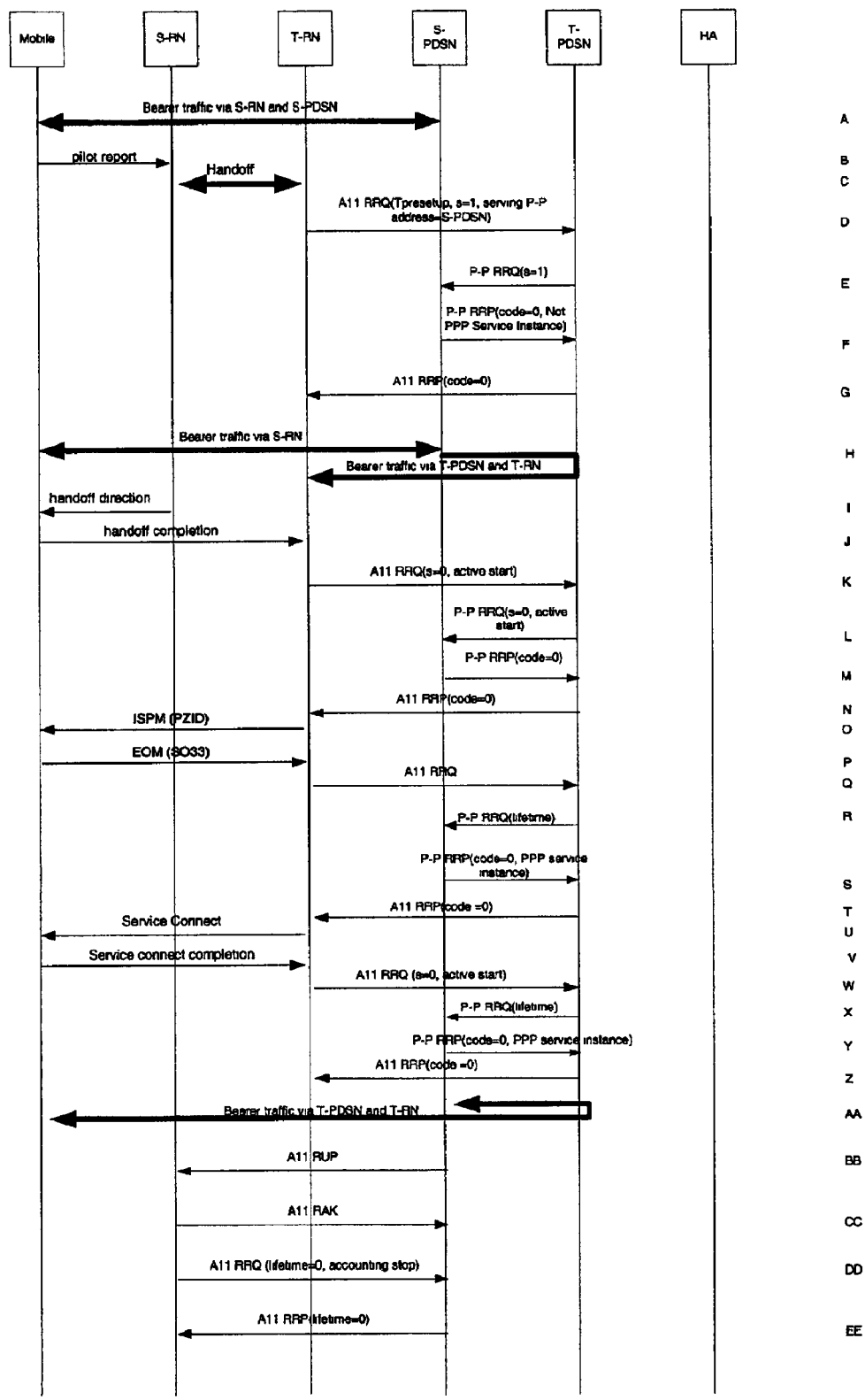
FIG. 5 is a timing diagram illustrating a call flow in a communication system, wherein the S-PDSN and the T-PDSN have similar capability, wherein one of the service instances is dormant.

In a fifth scenario, illustrated in FIG. 5, the MS again desires multiple SIs, specifically two, however, the main PPP SI is dormant. While the main SI is dormant, the corresponding A10 is still in place. For the Dormant Service Instance, the MS is responsible to trigger Dormant Handoff after detecting the Packet Zone ID (PZID) is changed upon receiving In-traffic System Parameter Message (ISPM) from the traffic channel. The PZID identifies the packet data network supporting the MS. There are two problems with this scenario. First, if the MS fails to receive the ISPM, the call is dropped as there is no A10 and no P—P connection for the PPP Service Instance. Second, the dormant service instance has to be transitioned to the Active state. The dormant service may not be required, and therefore making it active to accomplish handoff is a waste of resources. Each labeled step is illustrated in FIG. 5, and described as follows:

A. The mobile station has multiple sessions established to the S-PDSN via the S-RN. The mobile station has multiple service instance(s) in Dormant (for example, PPP service Instance) and has multiple service instances active and allocated in the S-RN.
B. The mobile station detects the pilot signal strength changes and sends pilot reports to the S-RN. At this time, the mobile still has airlink traffic channels to the S-RN and an IP session established to the S-PDSN.
C. S-RN sends handoff request message to T-RN via MSC (not shown here).
D. The T-RN sends an A11 RRQ to the T-PDSN including the s bit set to 1 and the serving P—P address attribute set to the Pi IP address of the S-PDSN.
E. The T-PDSN sends a P—P RRQ including the s bit set to 1 to the SPDSN's Pi IP address. The setting of the s bit indicates a request for a simultaneous binding at the S-PDSN.
F. The S-PDSN replies with a P—P RRP with the reply code set to 0.
G. The T-PDSN sends an A11 RRP with the reply code set to 0 to the T-RN.
H. At this point, forward direction bearer traffic arriving at the S-PDSN is bicast to the S-RN and the T-PDSN for the Active Service Instance. The T-RN may buffer the last N packets, where N is implementation dependent. Reverse direction bearer traffic traverses only the S-RN and the S-PDSN.
I. The S-RN hands off the mobile's service instance(s) to the T-RN by sending handoff direction command to the mobile station.
J. The mobile station handoffs to the T-RN and sends handoff completion indication to the T-RN.
K. Upon completion of the handoff of the service instances, the T-RN sends an A11 RRQ with the s bit set to 0 and including an active start airlink record to the T-PDSN.
L. The T-PDSN sends a P—P RRQ with the s bit set to 0 and including an active start airlink record to the S-PDSN.

The active start airlink record sent is the same one that was received from the T-RN.

M. The S-PDSN replies with a P—P RRP with the reply code set to 0.

N. The T-PDSN sends an A11 RRP with the reply code set to 0 to the T-RN.

O. The T-RN sends system information via In-Traffic System Parameter Message (ISPM) including the new Packet Zone ID (PZID).

P. The MS detects PZID is changed, the MS will send Ehanced Origination Message (EOM) to set up SO33 which is main service instance as an example.

Q. The T-RN sends A11 RRQ to setup A10 connection.

R. The T-PDSN sends P—P RRQ to setup P—P connection.

S. The S-PDSN replies with P—P RRP.

T. The T-PDSN replies with A11 RRP.

U. T-RN sends service connect to the MS to connect PPP service instance.

V. The MS replies with service connect completion.

W. Upon the PPP service instance is connected, T-RN sends A11 RRQ to start accounting record.

X. The T-PDSN sends P—P RRQ to S-PDSN.

Y. The S-PDSN replies with P—P RRP.

Z. T-PDSN replies with A11 RRP.

AA. At this point, forward direction bearer traffic for both PPP service instances and Secondary Service Instance are tunneled from the S-PDSN to the T-PDSN over the P—P interface, then switched onto the appropriate A10 session and delivered to the T-RN. Reverse direction bearer traffic is sent from the mobile to the T-RN, then over the appropriate A10 session to the T-PDSN. The T-PDSN tunnels this traffic over the P—P interface to the S-PDSN. Note that the P—P session may be periodically refreshed by the T-PDSN sending a P—P RRQ to the S-PDSN.

BB. The S-PDSN initiates a teardown of the mobile's A10/A11 session(s) to the S-RN by sending an A11 RUP to the S-RN.

CC. The S-RN responds with an A11 RAK.

DD. The S-RN indicates that the session will be terminated by sending an A11 RRQ to the S-PDSN with the lifetime set to 0, including an active stop accounting record.

EE. The S-PDSN indicates that the session is released by sending an A11 RRP to the S-RN with the lifetime set to 0. Note that the S-PDSN does not delete the associated PPP context because it is being used by the mobile via the P—P interface.

Figure 6:
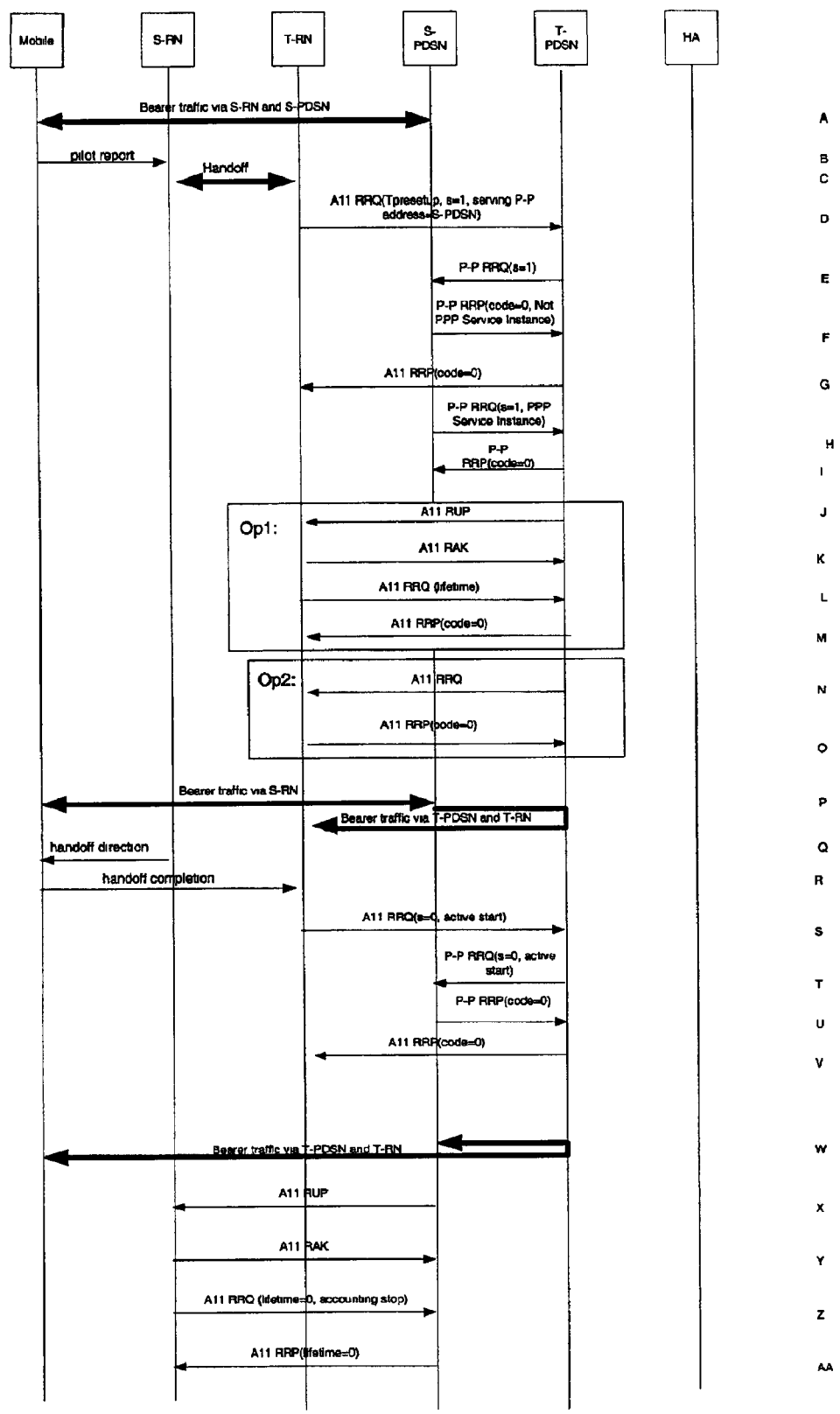
FIG. 6 is a timing diagram illustrating a call flow in a communication system, wherein the Source-PDSN (S-PDSN) and the Target-PDSN (T-PDSN) have similar capability, wherein the Radio Network (RN) triggers various Point-to-Point (PPP) connections to effect handoff.

In a sixth scenario, illustrated in FIG. 6, when the P—P Connection is successfully established for secondary Service Instances with S-PDSN, S-PDSN is responsible to trigger the set up of P—P connection for dormant PPP service instance or other dormant service instances as the S-PDSN has knowledge as to which service is in Dormant Mode. The T-PDSN may start to trigger the set up of A10 connections for the dormant service instances. The labeled steps of the call flow of FIG. 6 are described as follows:

A. The mobile station has multiple sessions established to the S-PDSN via the S-RN. The mobile station has multiple service instance(s) in Dormant (for example, PPP service Instance) and has multiple service instances active and allocated in the S-RN.

B. The mobile station detects the pilot signal strength changes and sends pilot reports to the S-RN. At this time, the mobile still has airlink traffic channels to the S-RN and an IP session established to the S-PDSN.

C. S-RN sends handoff request message to T-RN via MSC (not shown here).

D. The T-RN sends an A11 RRQ to the T-PDSN including the s bit set to 1 and the serving P—P address attribute set to the Pi IP address of the S-PDSN.

E. The T-PDSN sends a P—P RRQ including the s bit set to 1 to the S-PDSN's Pi IP address. The setting of the s bit indicates a request for a simultaneous binding at the S-PDSN.

F. The S-PDSN replies with a P—P RRP with the reply code set to 0.

G. The T-PDSN sends an A11 RRP with the reply code set to 0 to the T-RN.

H. Because S-PDSN knows PPP service instance is in Dormant mode, S-PDSN will sends P—P RRQ to T-PDSN to set up P—P connection.

I. T-PDSN replies with P—P RRP with result code set to '0'. There are two options here.

Option 1:

J. The T-PDSN sends A11 RUP to T-RN to request for establishing R-P connection for PPP service Instance.

K. The T-RN replies with A11 RAK.

L. Then the T-RN sends A11 RRQ to set up A10 connection.

M. T-PDSN replies with A11 RRP with code set to '0'.

Option 2:

N. The T-PDSN sends A11 RRQ to establish R-P connection for PPP service Instance.

O. The T-RN replies with A11 RRP with code set to '0'.

P. At this point, forward direction bearer traffic arriving at the S-PDSN is bicast to the S-RN and the T-PDSN for both PPP Service Instance and Secondary Service Instance. The T-RN may buffer the last N packets, where N is implementation dependent. Reverse direction bearer traffic traverses only the S-RN and the S-PDSN.

Q. The S-RN hands off the mobile's service instance(s) to the T-RN by sending handoff direction command to the mobile station.

R. The mobile station handoffs to the T-RN and sends handoff completion indication to the T-RN.

S. Upon completion of the handoff of the service instances, the T-RN sends an A11 RRQ with the s bit set to 0 and including an active start airlink record to the T-PDSN.

T. The T-PDSN sends a P—P RRQ with the s bit set to 0 and including an active start airlink record to the S-PDSN. The active start airlink record sent is the same one that was received from the T-RN.

U. The S-PDSN replies with a P—P RRP with the reply code set to 0.

V. The T-PDSN send an A11 RRP with the reply code set to 0 to the T-RN.

W. At this point, forward direction bearer traffic for both PPP service instances and Secondary Service Instance are tunneled from the S-PDSN to the T-PDSN over the P—P interface, then switched onto the appropriate A10 session and delivered to the T-RN. Reverse direction bearer traffic is sent from the mobile to the T-RN, then over the appropriate A10 session to the T-PDSN. The T-PDSN tunnels this traffic over the P—P interface to the S-PDSN. Note that the P—P session may be periodically refreshed by the T-PDSN sending a P—P RRQ to the S-PDSN.

X. The S-PDSN initiates a teardown of the mobile's A10/A11 session(s) to the S-RN by sending an A11 RUP to the S-RN.

Y. The S-RN responds with an A11 RAK.

Z. The S-RN indicates that the session will be terminated by sending an A11 RRQ to the S-PDSN with the lifetime set to 0, including an active stop accounting record.

AA. The S-PDSN indicates that the session is released by sending an A11 RRP to the S-RN with the lifetime set to 0. Note that the S-PDSN does not delete the associated PPP context because it is being used by the mobile via the P—P interface.

The scenarios and examples discussed hereinabove assume a same version of protocols for the serving network and the target network. In other words, these examples and scenarios assumed that the S-PDSN and the T-PDSN had similar capabilities. For example, each was able to support multiple Service Instances. Consider the situation where the packet data networks and/or the radio networks do not have similar capabilities, but rather, one is able to handle multiple SIs, while the other is not.

When the serving network has capability to support multiple SIs, and the target network does not, the system must determine which one to terminate and how to effect such termination. For example, when the handoff occurs from low revision PDSN (IS-835 Release A or lower) to high revision PDSN (IS-835 Release B or higher), there are no problems because IS-835-A PDSN can only support one packet data service instance. In this case, after handoff to the target PDSN, the secondary service instances can be setup. When the serving network has capability for only a single SI, as specified in IS-95. Also cdma2000 Release 0 specifies support for a single SI. Starting from cdma2000 Release A, multiple SI are specified to be supported, and the target has capability for multiple SIs, the responsibility is on the MS to initiate the additional SIs with the target network after handoff.

Figure 7:
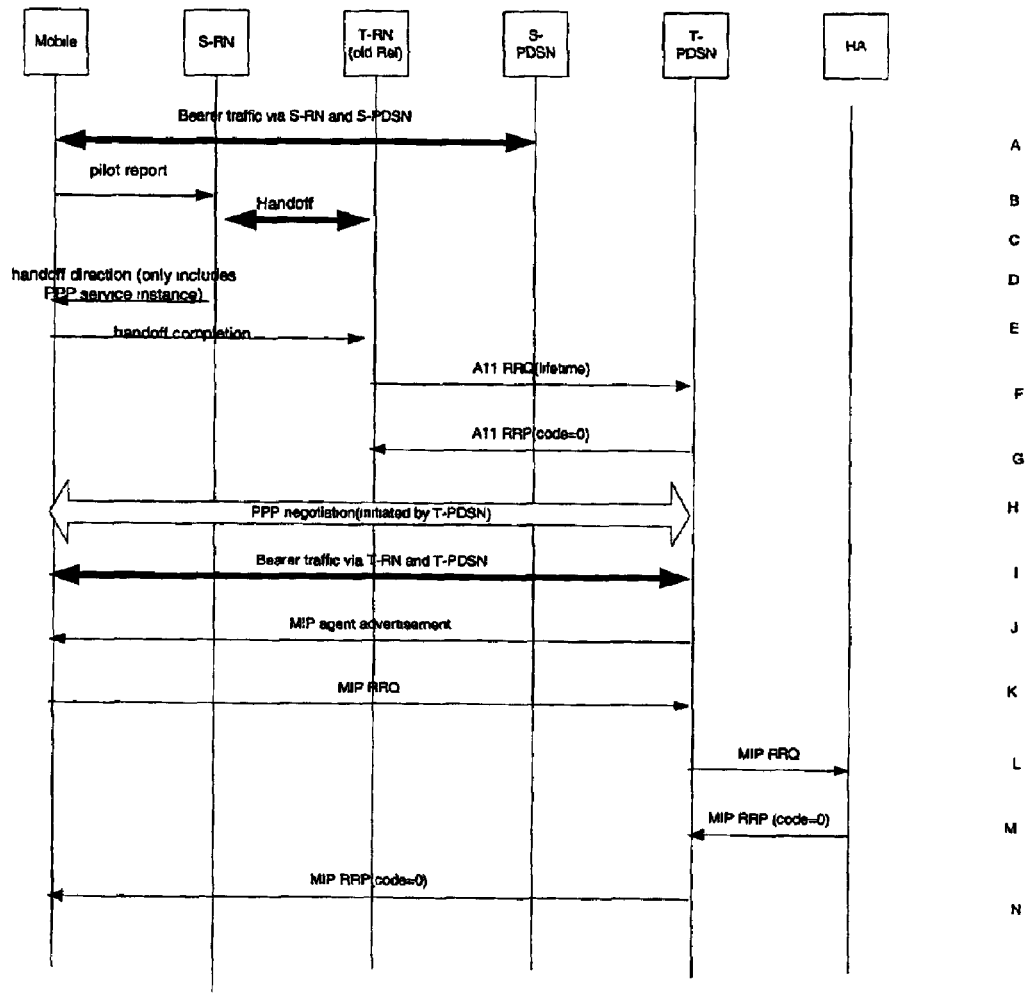
FIG. 7 is a timing diagram illustrating call flow in a communication system, wherein the Target-Radio Network (T-RN) does not support multiple service instances.
Figure 13:
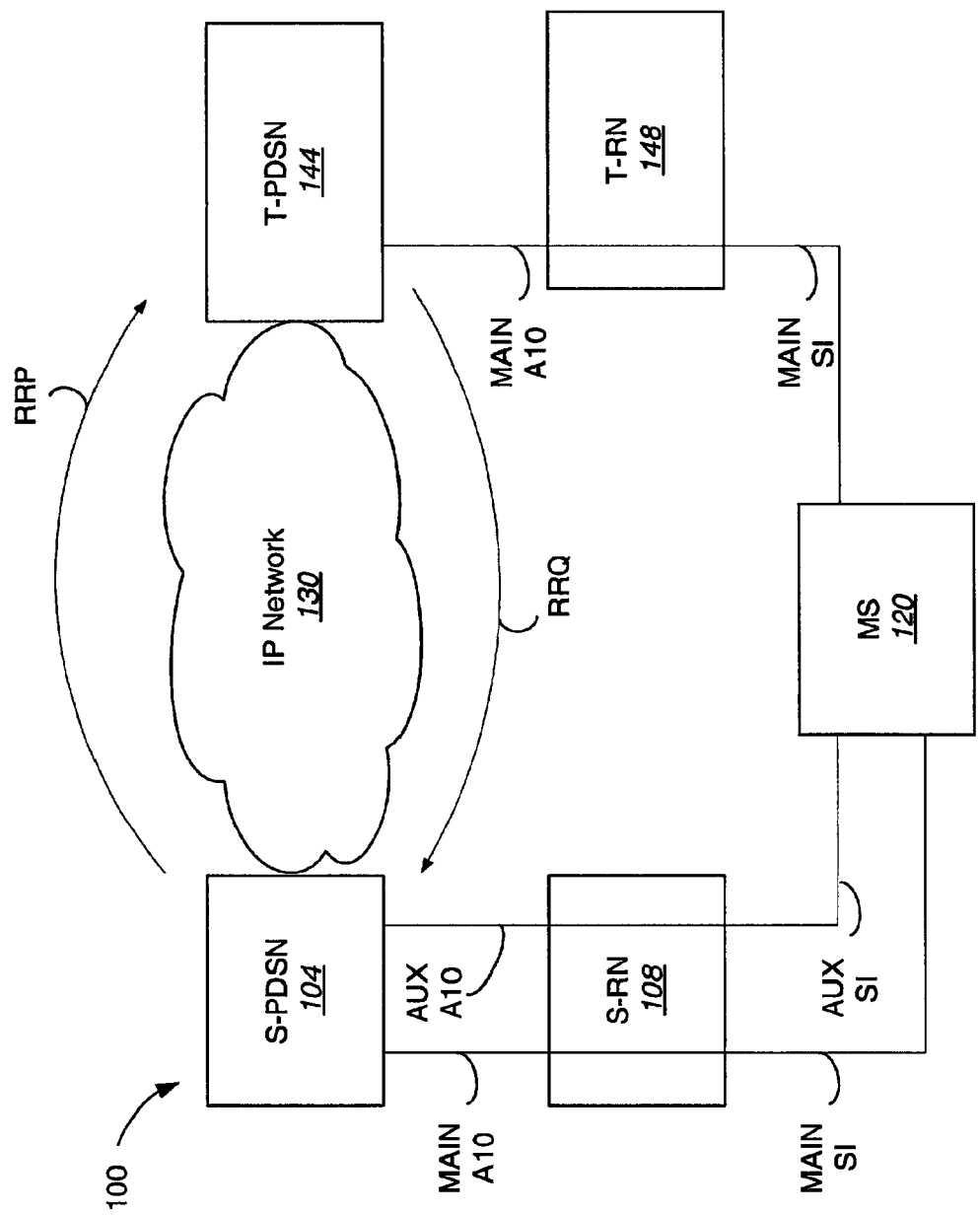
FIG. 13 illustrates communication links involved in a handoff example for a system wherein the Source-Radio Network (S-RN) and the Target-Radio Network (T-RN) have different capabilities.

A seventh scenario is illustrated in FIG. 7 and with respect to FIG. 13, wherein the target radio network, T-RN, is not able to support multiple SIs. Note that the serving radio network, S-RN, knows that the target network cannot support sessions that are active in the serving network prior to handoff. For example, when the handoff occurs from high revision PDSN (IS-835 Release B or higher) to low revision PDSN (IS-835 Release A or lower), if there are secondary service instances established, how to handle these multiple service instances becomes a problem. In this situation, because the serving RN knows the target RN cannot support concurrent services (multiple R-P connections), the serving RN only performs handoff for the main service instance (PPP Service instance) to T-RN. The MS may also indicate to the user that the secondary service instances are dropped because of roaming to a lower revisions area. Each of the labeled steps in the call flow of FIG. 7 is described as follows:

A. The mobile station has one or more sessions established to the S-PDSN via the S-RN. The mobile may have multiple service instances allocated in the S-RN.
B. The mobile station detects the pilot signal strength changes and sends pilot reports to the S-RN. Please note that the mobile still has airlink traffic channels to the S-RN and an IP session established to the S-PDSN.
C. S-RN sends handoff request message to T-RN via MSC (not shown).
D. Because S-RN knows the T-RN cannot support concurrent service, S-RN hands off the mobile's PPP service instance to the T-RN by sending handoff direction command to the mobile station.
E. The mobile station handoffs to the T-RN and sends handoff completion indication to the T-RN.
F. Upon completion of the handoff of the service instances, the T-RN sends an A11 RRQ with the s bit set to 0 and including an active start airlink record to the T-PDSN.
G. The T-PDSN sends an A11 RRP with the reply code set to 0 to the T-RN.
H. The T-PDSN initiates PPP negotiation with the mobile by sending it an LCP-configure-request.
I. PPP negotiation is complete. For simple IP sessions, bearer traffic may now flow in both directions over the T-RN and T-PDSN. For MIP sessions, the behavior is as follows below.
J. The T-PDSN sends a MIP agent advertisement to the mobile. Note that the mobile may first send a MIP agent solicitation to the T-PDSN (not shown).
K. The mobile sends a MIP RRQ to the T-PDSN.
L. The T-PDSN processes the MIP RRQ and then forwards it on to the HA.
M. If the MIP RRQ is accepted, the HA responds with a MIP RRP with a reply code of 0.
N. The T-PDSN forwards the MIP RRP to the mobile. The mobile may now send and receive bearer data via its MIP session.

FIG. 13 illustrates the system 100 including a T-PDSN 144, which may be capable of multiple SIs, but is illustrated supporting the one SI allowed by T-RN 148. After successful handoff to the target network, the main SI is established with T-RN 148 and the associated A10 connection is established between T-RN 148 and T-PDSN 144.

Figure 8:
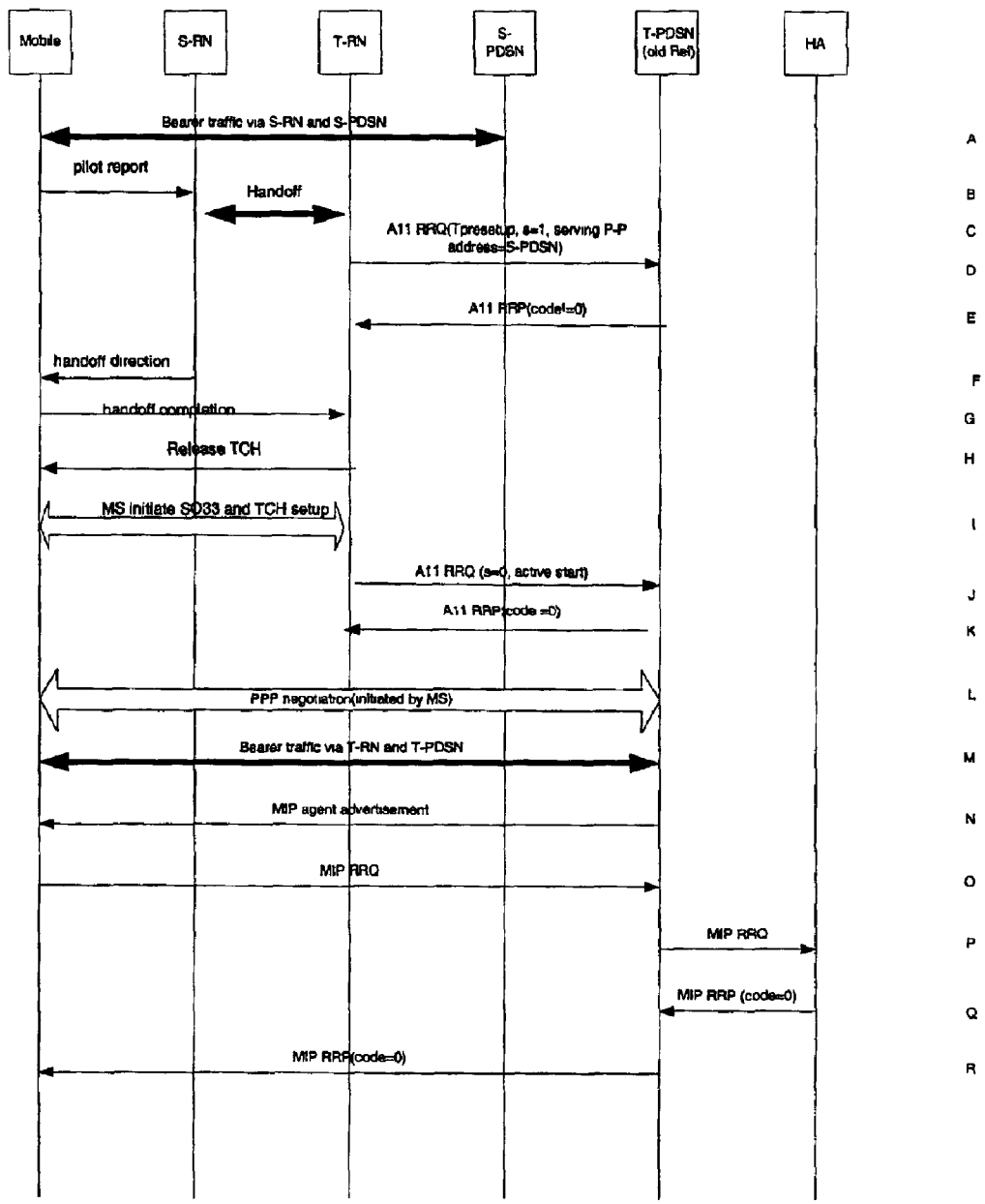
FIGS. 8 and 9 are timing diagrams illustrating call flow in a communication system, wherein the T-PDSN does not support multiple service instances.
Figure 12:
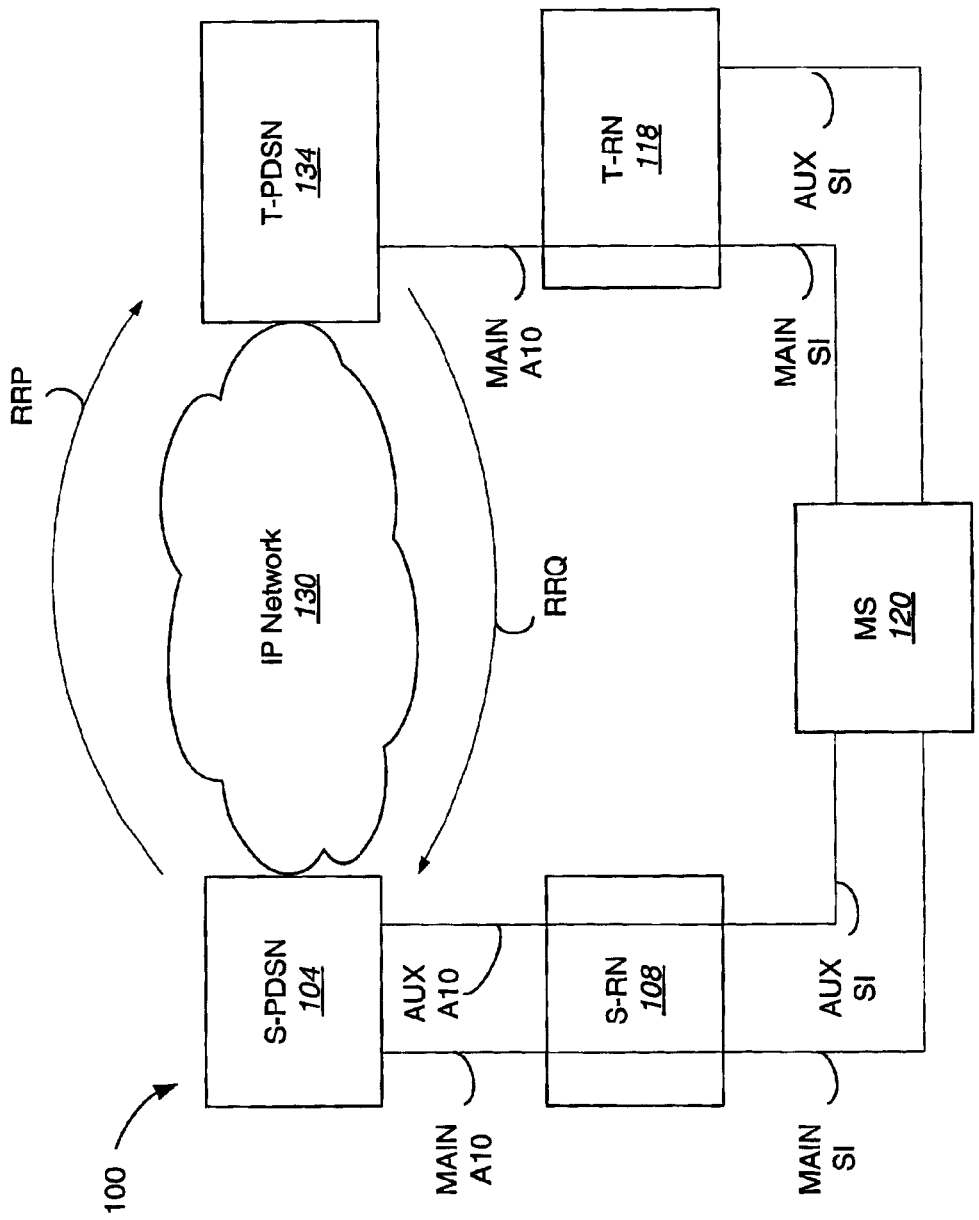
FIG. 12 illustrates communication links involved in a handoff example for a system wherein the S-PDSN and the T-PDSN have different capabilities.

In an eight scenario, illustrated in FIG. 8 and with respect to FIG. 12, the target RN can support concurrent service, i.e., multiple service instances, but the corresponding T-PDSN can not support multiple service instances. As illustrated in the call flow of FIG. 8, the T-RN sends an A11 RRQ to request for bicasting upon handoff is requested by the S-RN. Since the old revision of T-PDSN doesn't support P—P connection and bicasting establishment, the T-PDSN will send A11 RRP to indicate failure. In this case, T-RN doesn't know which is PPP service instance, the T-RN has to release traffic channel. The MS should indicate the user call is dropped because of roaming to the low revision area. If needed, the MS will start to set up SO33 from the beginning. Each of the labeled step of FIG. 8 is described as follows:

A. The mobile station has one or more sessions established to the S-PDSN via the S-RN. The mobile may have multiple service instances allocated in the S-RN.
B. The mobile station detects the pilot signal strength changes and sends pilot reports to the S-RN. Please note that the mobile still has airlink traffic channels to the S-RN and an IP session established to the S-PDSN.
C. S-RN sends handoff request message to T-RN via MSC (not shown here).
D. The T-RN sends an A11 RRQ to the T-PDSN including the s bit set to 1 and the serving P—P address attribute set to the Pi IP address of the S-PDSN.
E. Since the T-PDSN does not support fast P—P interface handoff, the T-PDSN sends an A11 RRP with the reply code set to other than 0 to the T-RN.
F. The S-RN hands off the mobile's service instance(s) to the T-RN by sending handoff direction command to the mobile station.
G. The mobile station handoffs to the T-RN and sends handoff completion indication to the T-RN.
H. Upon completion of the handoff of the service instances, the T-RN releases the traffic channel since it doesn't know which service instance is PPP service instance.
I. The MS re-initiates the SO33 to setup the traffic channel.
J. T-RN sends A11 RRQ to set up R-P connection.
K. T-PDSN replies with A11 RRP with result code set to '0'.
L. The MS initiates PPP negotiation with the T-PDSN by sending it an LCP-configure-request.
M. PPP negotiation is complete. For simple IP sessions, bearer traffic may now flow in both directions over the T-RN and T-PDSN. For MIP sessions, the behavior is as follows below.
N. The T-PDSN sends a MIP agent advertisement to the mobile. Note that the mobile may first send a MIP agent solicitation to the T-PDSN (not shown).

O. The mobile sends a MIP RRQ to the T-PDSN.

P. The T-PDSN processes the MIP RRQ and then forwards it on to the HA.

Q. If the MIP RRQ is accepted, the HA responds with a MIP RRP with a reply code of 0.

R. The T-PDSN forwards the MIP RRP to the mobile. The mobile may now send and receive bearer data via its MIP session.

FIG. 12 illustrates the system 100 including a T-PDSN 134 which is not capable to support multiple sessions. Therefore, even though, the T-RN 118 may support multiple SIs, only the main SI has a corresponding A10 connection established with T-PDSN 134.

Figure 9:
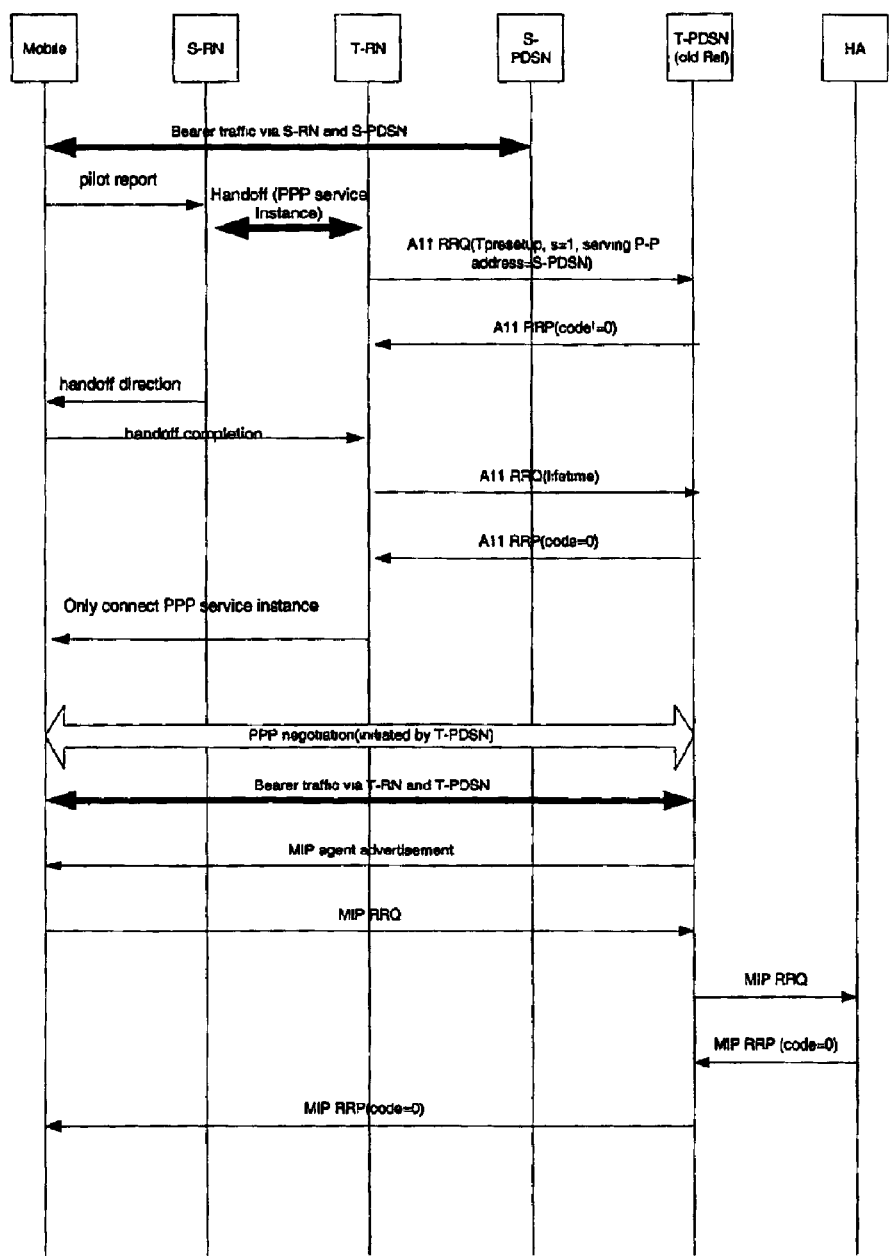

In a ninth scenario, illustrated in FIG. 9, during the handoff between T-RN and S-RN, the PPP service instance information is also exchanged. Therefore, when The T-RN receives failure indication from T-PDSN, the T-RN only release the secondary service instance and keep the PPP service instance connected. Each of the labeled steps of the call flow of FIG. 9 is described as follows:

A. The mobile station has one or more sessions established to the S-PDSN via the S-RN. The mobile may have multiple service instances allocated in the S-RN.

B. The mobile station detects the pilot signal strength changes and sends pilot reports to the S-RN. Please note that the mobile still has airlink traffic channels to the S-RN and an IP session established to the S-PDSN.

C. S-RN sends handoff request message to T-RN via MSC (not shown here). Also the S-RN indicate the PPP service instance to T-RN.

D. The T-RN sends an A11 RRQ to the T-PDSN including the s bit set to 1 and the serving P—P address attribute set to the Pi IP address of the S-PDSN.

E. Since the T-PDSN does not support fast P—P interface handoff, the T-PDSN sends an A11 RRP with the reply code set to other than 0 to the T-RN.

F. The S-RN hands off the mobile's service instance(s) to the T-RN by sending handoff direction command to the mobile station.

G. The mobile station handoffs to the T-RN and sends handoff completion indication to the T-RN.

H. Since the T-RN knows which service instance is PPP service instance, the T-RN sends A11 RRQ to set up R-P connection for PPP service instance.

I. T-PDSN replies with A11 RRP with result code set to '0'.

J. The T-RN also sends service connect to the MS to release the Secondary Service Instance and maintain the PPP Service Instance.

K. T-PDSN will trigger the PPP negotiation by sending LCP Configure Request.

L. PPP negotiation is complete. For simple IP sessions, bearer traffic may now flow in both directions over the T-RN and T-PDSN. For MIP sessions, the behavior is as follows below.

M. The T-PDSN sends a MIP agent advertisement to the mobile. Note that the mobile may first send a MIP agent solicitation to the T-PDSN (not shown).

N. The mobile sends a MIP RRQ to the T-PDSN.

O. The T-PDSN processes the MIP RRQ and then forwards it on to the HA.

P. If the MIP RRQ is accepted, the HA responds with a MIP RRP with a reply code of 0.

Q. The T-PDSN forwards the MIP RRP to the mobile. The mobile may now send and receive bearer data via its MIP session.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for handoff in a communication system, comprising:

prior to initiation of a handoff, establishing a main link and a secondary link between a mobile unit and a serving packet data service node via a serving radio network, the main link and the secondary link corresponding to separate connections between the serving packet data service node and the serving radio network;

initiating the handoff from the serving radio network to a target radio network; and sending a message to a target packet data service node identifying the main link.

2. The method as in claim 1, further comprising:
establishing a main link and a secondary link between the mobile unit and the target packet data service node.

3. The method as in claim 2, further comprising:
sending a Point-to-Point Protocol (PPP) configuration request from the target packet data service node to the mobile unit.

4. The method as in claim 1, wherein the main link is associated with a first service instance, and the secondary link is associated with a second service instance.

5. The method as in claim 4, wherein the second service instance is a Voice over Internet Protocol service.

6. The method as in claim 1, wherein the serving packet data service node and the target packet data service node incorporate compatible protocols.

7. The method as in claim 6, wherein the compatible protocols are a same protocol.

8. The method as in claim 1, wherein the initiating further comprises:
sending a pilot report from the mobile unit to the serving radio network.

9. The method as in claim 8, further comprising:
sending a handoff message form the service radio network to the target radio network.

10. The method as in claim 9, wherein the pilot report identifies a pilot signal strength.

11. The method as in claim 1, wherein the message is a reply to a registration request.

12. A method for handoff in a communication system, comprising:
initiating handoff from a serving radio network to a target radio network, wherein prior to initiation of the handoff, a first link and a second link are established between a mobile unit and a serving packet data service node via a serving radio network, the first link and the second link corresponding to separate connections between the serving packet data service node and the serving radio network;

receiving a registration request from the target radio network;

sending a link initiation message to the mobile unit on the first link via the target radio network, the first link associated with a first service instance; and sending the link initiation message to the mobile unit on the second link via the target radio network, the second link associated with a second service instance.

13. The method as in claim 12, wherein the first link is a Point-to-Point Protocol (PPP) connection.

14. The method as in claim 13, wherein the second link is an auxiliary link for Voice over Internet Protocol.

15. The method as in claim 12, further comprising:
requesting registration from a serving packet data service node.

16. A method for handoff in a communication system, comprising:
prior to initiation of a handoff, establishing a main link and a secondary link between a mobile unit and a serving packet data service node via a serving radio network, the main link and the secondary link corresponding to separate connections between the serving racket data service node and the serving radio network;

initiating the handoff from the serving radio network to a target radio network, the serving radio network adapted to support multiple service instances, the target radio network adapted to support one service instance;

terminating the secondary link to the serving radio network;

sending main link information of the serving radio network to the target radio network; and performing the handoff to the target radio network.

17. A method for handoff in a communication system, comprising:
prior to initiation of a handoff, establishing a main link and a secondary link between a mobile unit and a serving packet data service node via a serving radio network, the main link and the secondary link corresponding to separate connections between the serving packet data service node and the serving radio network;

initiating the handoff from a serving radio network to a target radio network, the serving radio network coupled to a serving packet data service node adapted to support multiple service instances, the target radio network coupled to a target packet data service node adapted to support one service instance;

sending main link information of the serving radio network to the target radio network; and performing the handoff to the target radio network.

18. An apparatus in a communication system, comprising:
means for establishing, prior to initiation of a handoff, a main link and a secondary link between a mobile unit and a serving packet data service node via a serving radio network, the main link and the secondary link corresponding to separate connections between the serving packet data service node and the serving radio network;

means for initiating the handoff from the serving radio network to a target radio network; and means for sending a message to a target packet data service node identifying the main link.

19. An apparatus in a communication system, comprising:
means for initiating handoff from a serving radio network to a target radio network, wherein prior to initiation of the handoff, a first link and a second link are established between a mobile unit and a serving packet data service node via a serving radio network, the first link and the second link corresponding to separate connections between the serving packet data service node and the serving radio network;

means for receiving a registration request from the target radio network;

means for sending a link initiation message to the mobile unit on the first link via the target radio network, the first link associated with a first service instance; and means for sending the link initiation message to the mobile unit on the second link via the target radio network, the second link associated with a second service instance.

20. An apparatus in a communication system, comprising:
means for establishing, prior to initiation of a handoff, a main link and a secondary link between a mobile unit and a serving packet data service node via a serving radio network, the main link and the secondary link corresponding to separate connections between the serving packet data service node and the serving radio network;

means for initiating the handoff from the serving radio network to a target radio network, the serving radio network adapted to support multiple service instances, the target radio network adapted to support one service instance;

means for terminating the secondary link to the serving radio network;

means for sending main link information of the serving radio network to the target radio network; and means for performing the handoff to the target radio network.

21. A packet data service node in a communication system, adapted to:

establish, prior to initiation of a handoff, a main link and a secondary link with a mobile unit via a serving radio network, the main link and the secondary link corresponding to separate connections between the serving packet data service node and the serving radio network;

initiate the handoff to a target radio network; and send a message to a target packet data service node identifying the main link.

* * * * *